(12) United States Patent
Bieck et al.

(10) Patent No.: US 7,464,613 B2
(45) Date of Patent: Dec. 16, 2008

(54) PRESSURE SENSOR COMPRISING AN ELASTIC SENSOR LAYER WITH A MICROSTRUCTURED SURFACE

(75) Inventors: Werner Bieck, Wiltingen (DE); Aloyse Kirsch, Contern (LU); Alain Schumacher, Mertert (LU); Aloyse Schoos, Bertrange (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 0 days.

(21) Appl. No.: 10/541,721

(22) PCT Filed: Dec. 23, 2003

(86) PCT No.: PCT/EP03/51099

§ 371 (c)(1),
(2), (4) Date: Jan. 9, 2006

(87) PCT Pub. No.: WO2004/061401

PCT Pub. Date: Jul. 22, 2004

(65) Prior Publication Data

US 2006/0162471 A1 Jul. 27, 2006

(30) Foreign Application Priority Data

Jan. 7, 2003 (EP) .................. 03100008

(51) Int. Cl.
G01L 1/04 (2006.01)
G01L 1/22 (2006.01)

(52) U.S. Cl. ................................ 73/862.632

(58) Field of Classification Search ............ 73/862.632, 73/862.391
See application file for complete search history.

(56) References Cited

U.S. PATENT DOCUMENTS

| 3,899,766 | A | * | 8/1975 | Melmelstein ................. 338/42 |
| 4,322,707 | A | * | 3/1982 | Ort ............................... 338/2 |
| 4,385,525 | A | * | 5/1983 | Phillips et al. ................ 73/720 |
| 4,419,653 | A | * | 12/1983 | Waigand ..................... 338/114 |
| 4,996,511 | A | | 2/1991 | Ohkawa et al. ............. 338/114 |
| 5,302,936 | A | | 4/1994 | Yaniger ....................... 338/47 |
| 5,948,990 | A | * | 9/1999 | Hashida ....................... 73/725 |
| 6,109,117 | A | | 8/2000 | Stanley et al. .......... 73/862.325 |

(Continued)

FOREIGN PATENT DOCUMENTS

DE 30 39 256 4/1982

OTHER PUBLICATIONS

International Search Report; PCT/EP03/51099; Apr. 26, 2004.

*Primary Examiner*—Edward Lefkowitz
*Assistant Examiner*—Octavia Davis
(74) *Attorney, Agent, or Firm*—Cantor Colburn LLP

(57) ABSTRACT

Disclosed is a pressure sensor comprising sensor layers (12, 14) which are made of an elastic, resistive material and are applied to a polymer film that is not represented. (22) embodies a spacer that is coated with an adhesive. One sensor layer (14) is provided with a microstructured surface encompassing spherical structures (20) within an active zone (16). The compression path amounts to 10 micrometers at an extension R of the structures of 50 micrometers. The structures (20) are large compared with a certain surface roughness. The inventive pressure sensor is produced by injection molding, etching, embossing, or by of an electron beam technique or laser beam technique. Disclosed are variations thereof, which function differently.

28 Claims, 3 Drawing Sheets

U.S. PATENT DOCUMENTS

Figure 1A:
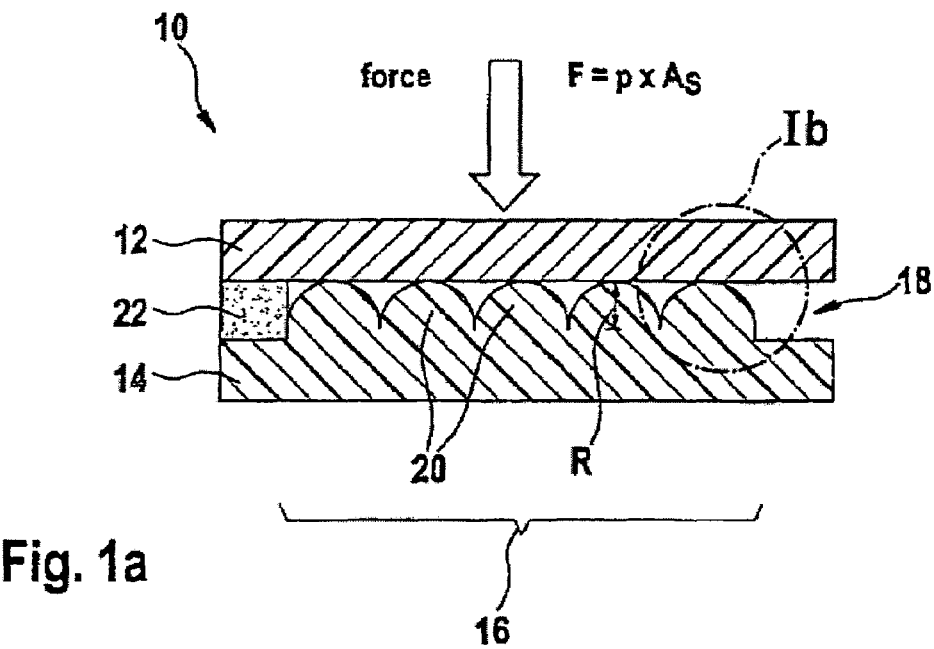

| | | | |
|---|---|---|---|
| 6,114,645 A * | 9/2000 | Burgess | 200/512 |
| 6,505,521 B1 * | 1/2003 | Petri et al. | 73/862.042 |
| 6,875,938 B2 * | 4/2005 | Schmiz et al. | 200/310 |
| 7,064,650 B2 * | 6/2006 | Bieck et al. | 338/47 |
| 7,161,460 B2 * | 1/2007 | Federspiel | 338/47 |
| 7,187,264 B2 * | 3/2007 | Bieck et al. | 338/47 |
| 2001/0008389 A1 | 7/2001 | Serban et al. | 338/47 |

* cited by examiner

PRESSURE SENSOR COMPRISING AN ELASTIC SENSOR LAYER WITH A MICROSTRUCTURED SURFACE

This application is a 371 of PCT/EP03/51099.

TECHNICAL FIELD OF INVENTION

This invention concerns a pressure sensor, especially a pressure sensor functioning on a micromechanical basis.

BACKGROUND OF RELATED ART

The field of applications for pressure sensors to detect a force or pressure exerted on a surface has grown considerably in recent years. For most of these applications, the primary need is for pressure sensors that can be manufactured at modest cost. For this reason, foil type pressure sensors in particular have become very widespread.

A pressure sensor of this type, economical to manufacture and versatile in its applications, is described for example in. U.S. Pat. No. 4,314,227. The foil type pressure sensors described in this document are provided with two supporting plates held a certain distance apart by means of a spacer. At least one of these supporting plates is flexible in construction, so that when a force acts on the sensor, the flexible supporting plate can be pressed against the other supporting plate, opposed by the restoring force of the flexible supporting plate. On one of the carrier foils, two electrode structures are arranged at a certain distance from each other, while on the other supporting plate a layer of semi-conductive material is arranged which is pressed against the two electrode structures under the action of an external force.

The semi-conductive material displays a particulate structure, so that the surface of the semi-conductive layer displays a degree of roughness with numerous projecting, randomly distributed contact points. When pressure begins to be applied to the sensor element, the two supporting plates are first brought together until a first contact is made between the electrode structures and the semi-conductive layer. Below this turn-on point, the electrical resistance of the sensor is infinite. As the pressure increases, the semi-conductive layer is pressed further against the electrode structures, increasing the area of contact between the electrode structures and the semi-conductive layer. As this happens, the number of contact points where the semi-conductive layer makes electrical contact with the electrode structures is simultaneously increased, so that the electrical surface resistance between the semi-conductive layer and the electrode structures diminishes. This reduced surface resistance can be measured and serves as the measurement value for the pressure exerted on the sensor. If the pressure exerted on the sensor eases, the elastic restoring force of the supporting plates causes the distance between the semi-conductive layer and the electrode structures to increase, and the number of contact points diminishes in consequence.

The cell mechanics of such a pressure sensor can be described in terms of a membrane model. The deflection of the membrane is proportional to the pressure exerted on it and also depends on the elastic physical properties, material strength and tension of the membrane. Above the turn-on point, the resulting resistance is essentially a function of the pressure-dependent radius of the contact surface. It follows from this that the electrical response function of the pressure sensor reacts strongly to variations in a specific cell configuration and, for example, where a membrane deforms by reason of alterations in humidity or temperature, is subject to considerable variations. For this reason, such pressure sensors are unsuitable in particular for fields in which a precise turn-on point is required at relatively low pressures. In fact, even very small variations in cell configuration, e.g. through deformation of the membrane, lead to displacements of the turn-on point in the same order of magnitude as the required reaction threshold. In addition, the random variations in the distribution of the contact points in the semi-conductive layer lead to behaviour of the sensor that is difficult to verify above its reaction threshold.

BRIEF SUMMARY OF THE INVENTION

It was consequently the task of this invention to propose an improved pressure sensor element.

This task is fulfilled according to the invention by a pressure sensor according to claim 1. This pressure sensor comprises a first carrier foil with a first sensing layer and a second carrier foil with a second sensing layer, the first and second carrier foils being arranged in such a way in relation to each other that the first and second sensing layers form a contact surface with each other. The first and second sensing layers are configured such that the electrical resistance between two terminal contacts of the sensor depends on the extent of the area of contact between the two sensing layers. According to the invention, at least the second sensing layer comprises, in the region of an active zone of the sensor, a microstructured surface having predefined structures formed of an elastic material, wherein the structures of the second sensing layer are in contact with the first sensing layer and form the area of contact in conjunction with the first sensing layer, and wherein the structures are compressed under the influence of pressure exerted on the pressure sensor so that the extent of the area of contact is increased.

In this sensor, the predefined structures formed of elastic material in the second sensing layer are elastically compressed under the influence of a force exerted on the sensor. Due to the resulting deformation of the structures, the contact area between these structures and the sensing layer is increased. If the force exerted on the pressure sensor eases, the restoring force of the elastic structures causes the deformation engendered by the compression to be reversed, so that the contact area between these structures and the first sensing layer is once more diminished.

In contrast to known foil type pressure sensors, in this pressure sensor both its electrical behaviour and its elastic behaviour are consequently determined by the microstructured surface of the second sensing layer. Hence the resistance behaviour of this pressure sensor is largely independent of the mechanical properties of the carrier foils. A deformation occurring in the foils or an alteration in the mechanical foil characteristics due to temperature fluctuations thus has no significant effect on the response function of the sensor. As the restoring forces of the pressure sensor no longer need to be supplied by the carrier foils, the latter can be manufactured from cheaper materials and having a reduced thickness as for conventional foil type pressure sensors. This results in considerable savings especially as regards foil type pressure sensors, the applications of which demand the use of relatively costly PI carrier foils.

Furthermore, the changes in resistance of the pressure sensor according to the invention are not a function of an increase in the number of points of contact between the first and second sensing layers, but of the increase in the area of contact in consequence of a compression of the structures defined on or incorporated in the microstructured surface. The pressure-dependent alterations of the area of contact, and hence the electrical behaviour of the sensor according to the invention, can be controlled in a defined manner by means of a well-defined formation of the microstructures, i.e. a well-defined topography of the surface of the second sensing layer. Any dependency of behaviour under pressure on a random distribution of particulate material is thus effectively prevented. The skilled person will understand in this connection that the structures incorporated in a defined manner in the second sensing layer are large by comparison with the typical roughness of a layer material. For example, the structures have an extent that is greater than a typical roughness by at least one order of magnitude. This ensures that the electrical behaviour is really induced by the predefined incorporated structures and not by phenomena engendered by the surface roughness of the layer. This clear separation of electrical behaviour from stochastic phenomena enables reproducible manufacture of extremely sensitive pressure sensors.

It should be noted that in this sensor the first and second sensing layers already form an area of contact even if no external force is exerted on the sensor element. In consequence, this sensor element, even when under no load, exhibits an electrical resistance, which is finite, and therefore measurable. Thus the pressure sensor according to the invention displays no threshold of reaction in its electrical behaviour, so that even the smallest forces will engender an alteration in its electrical resistance. In addition, the finite resistance enables efficient checking of the conductors of the pressure sensor, since the finite resistance can be measured at any time. With the foil type pressure sensors described above, such a check on the conductors in an unlade state is simply not possible.

It should also be observed that the first sensing layer preferably comprises a first resistive material that also possesses elastic properties. In this case, both layers are compressed under the effect of pressure, so that the restoring force of the two sensing layers causes a return to the initial configuration when the load eases. In addition, the first sensing layer may also display a microstructured surface, so that the structures of the first sensing layer and those of the second sensing layer may possess either similar or disparate forms and/or extents.

In an advantageous embodiment of the pressure sensor, the first sensing layer comprises a first resistive material, which may be applied, in the region of the active zone of the pressure sensor, for example in a flat layer to the carrier foil. In this context, resistive material should be taken to mean a material that displays electrical conductivity, but whose electrical resistivity is nevertheless significantly higher than that of conductive materials such as metals, for example. With such a resistive material, it is easy to generate a resistance behaviour dependent on area of contact without giving complex forms to the sensing layer.

In an advantageous embodiment of the pressure sensor, the structures of the second sensing layer comprise a second resistive material. The second resistive material is preferably matched to the first resistive material in such a way that it results in a predetermined behaviour of the area resistance between the two sensing layers. It should be noted that the entire second sensing layer is preferably made from the second resistive material. Such an embodiment is distinguished by particularly easy assembly and hence economical manufacture. Depending on the application of the pressure sensor, it may however be desirable that the second sensing layer should consist of a base layer and a structure layer arranged on the base layer, the base layer being composed of a material having specific mechanical or electrical properties, while only the structure layer with the structures formed in it is made from the second resistive material.

To ensure particularly dynamic behaviour of the pressure sensor, at least one of the structures can be coated in least in some parts with a conductive metal, e.g. a metal. In such an embodiment, even a small alteration in the force acting on the sensor can engender a relatively large alteration in resistance in the pressure sensor. The skilled person will easily understand that with such an embodiment, all the structures can advantageously be coated in some zones with a conductive material, wherein depending on the electrical circuit design, it should be ensured that the conductive layers of the individual structures are separated from each other by insulating zones.

In another embodiment of the second sensing layer, the structures of the second sensing layer comprise an insulating material, and at least one of the structures is coated at least in certain parts with a conductive material or a second resistive material. Depending on the material employed, such an embodiment of the second sensing layer may be more economical to manufacture than an embodiment in which all the structures are composed of a resistive material. In addition, depending on the area of application, such an embodiment may display mechanical or electrical advantages with respect to the embodiments described above.

It should be noted that, depending on the embodiment of the pressure sensor, the first and second resistive materials may be identical. Alternatively, the first and second sensing layers may be composed of disparate resistive materials. In this case, the second resistive material may, for example, have a lower resistance than the first resistive material. Especially in the above described embodiment, in which the structures of the second sensing layer comprise an insulating material and are coated in certain parts with a second resistive material, it may be necessary in this case, depending on the electrical circuitry of the pressure sensor, to separate the coatings on the individual structures with insulating zones.

It should be noted that the embodiments of the sensing layers cited above enable particularly simple manufacture of the layers, as complicated shapes in the sensing layers are not needed to obtain the desired pressure-sensitive behaviour. Pressure sensors constructed in this way can consequently be produced particularly reliably and economically.

The electric wiring of the pressure sensors can be carried out in different ways. For example, the first sensing layer can be contacted at two spatially separated connection points by the terminal contacts. The two connection points may, for example, be positioned opposite each other with respect to the active zone of the sensor. The electrical resistance of such a pressure sensor when not under load is essentially determined by the first resistive material of the first sensing layer located between the two contact points. When a force is exerted on the pressure sensor, the second sensing layer is switched electrically in parallel with the first sensing layer by the compressed structures, the resistance between the two terminal contacts being diminished by the increase in area of contact between the two sensing layers.

In an alternative embodiment, each of the first and second sensing layers is contacted, on the side facing away from the other sensing layer, in an extended area by one of the terminal contacts. Contacting preferably occurs through the fact that both terminal contacts are made flat and each sensing layer is applied flat to its corresponding terminal contact. In this case, the resistance of the pressure sensor is given by the combined resistance of the two sensing layers perpendicularly across the layers, the resistance at the boundary between the two sensing layers being dominant. The greater the contact area between the two sensing layers, the smaller will be this surface resistance.

In another embodiment based on the connection in parallel of two resistive layers, each of the first and second sensing layers is contacted at one point by one of the terminal contacts, the two contact points being positioned opposite each other with respect to the active zone of the sensor.

It should be noted that the first and/or second resistive material preferably comprises a conductive elastomer material. These conductive elastomer materials, for example polymer with a filler of conductive pigment or self-conductive polymer, are low in cost and easily worked. In addition, these materials display high elasticity, enabling reversible compressibility of the structures.

The structures of the microstructured surface can be produced in a variety of ways. It will be apparent to the skilled person, that such structures, which should preferably be evenly incorporated in the sensing layer, can be produced by injection moulding, chemical, electrochemical or photochemical etching, stamping, electron beam machining and/or laser beam machining. These processes may actively structure the sensing layer, or may be used for a passive process, forming a die (negative) with which to produce the sensing layer.

The microstructured surfaces produced by these techniques preferably have a form that tapers in the direction of the first sensing layer. Possible shapes include, for example, hemispheres, pyramids, truncated pyramids, cones, truncated cones, etc.

Lastly, it should be observed that the first and second carrier foils can advantageously be laminated together with adhesive. This can be achieved, for example, by applying a coat of adhesive to those zones of the second sensing layer that are not structured (spacer), thus positioning the first carrier foil at a distance R.

BRIEF DESCRIPTION OF THE SEVERAL FIGURES

Figure 3:
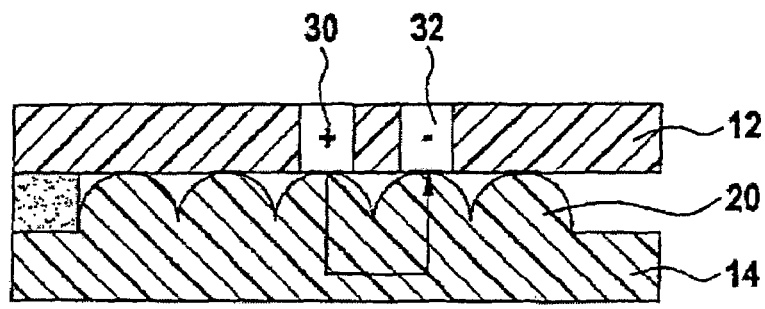
Figure 4:
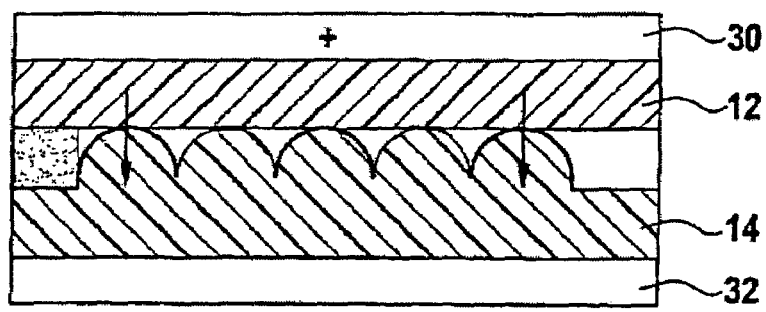
Figure 5:
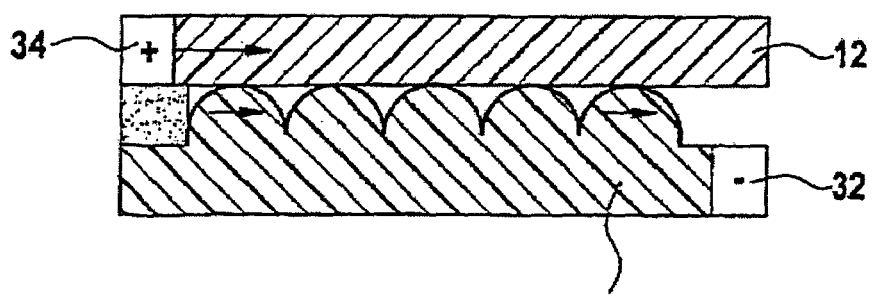

An embodiment of the invention is described below with reference to the attached drawings. These show the following:

FIG. 1 A diagrammatic cross-section through a pressure sensor (a) together with an enlarged detail of this pressure sensor (b) to illustrate the processes triggered by a force exerted on the pressure sensor;

FIG. 2 A cross-section through a first embodiment of a pressure sensor (a) together with a top view of this pressure sensor;

FIGS. 3-5 Further embodiments of the pressure sensor.

DETAILED DESCRIPTION OF THE INVENTION

Figure 1B:
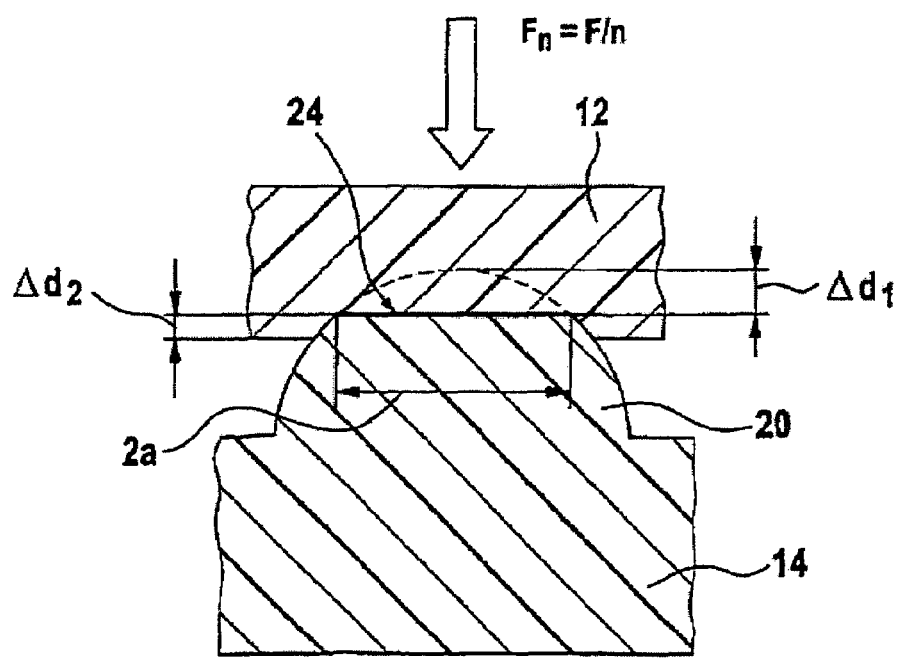

This invention concerns pressure sensors based on the elastomechanical deformation of a microstructured surface. FIG. 1a diagrammatically represents the construction of such a pressure sensor 10. The sensor 10 essentially comprises a first sensing layer 12 and a second sensing layer 14 made of an elastic and resistive material, each generally applied to a carrier foil (polymer foil) (not shown). The sensing layers 12 and 14 are so arranged with respect to each other that in an active zone 16 of the pressure sensor 10 they form an area of contact between them.

The second sensing layer 14 has, in the region of an active zone 16 of the pressure sensor 10, a microstructured surface 18 having predefined structures 20 made of an elastic material formed therein. FIG. 1a shows a typical embodiment of such a pressure-sensitive microstructure 18. For this, the second sensing layer 14 comprises in the region of the active zone 16 a well-defined topography which, in the embodiment shown, takes the form of spherical structures 20 of radius R. These structures 20 are large by comparison with a typical surface roughness, for example by at least one order of magnitude. The unstructured zones of the sensing layer 14 are coated with an adhesive 22 (spacer) in order to position the first sensing layer 12 at distance R from the unstructured zones in such a way that the first sensing layer 12 is in contact with the structures 20.

An applied force F compresses both sensing layers 12 and 14, and in the case of n microstructures, each one supports a load of F/n. The elastomechanical deformation $\Delta d_1$ and $\Delta d_2$ of the second or first sensing layer, as the case may be, thus engenders a pressure-dependent area of contact 24 between the two sensing layers 12 and 14 (see FIG. 1b). The shape of the area of contact 24 and the force or pressure-dependent development of this area depend on the elastic properties of the material and the selected surface topography. In consideration of this, the elastic properties of the material should preferably be selected such that the resulting deformation is only elastic (for example, typical compression distances for a pressure sensor are in the region of 10 μm for a distension R of the structures of about 50 μm), so that when the force F eases, the pressure sensor returns to its original state under the influence of the restoring forces in the sensing layers.

Figure 2A:
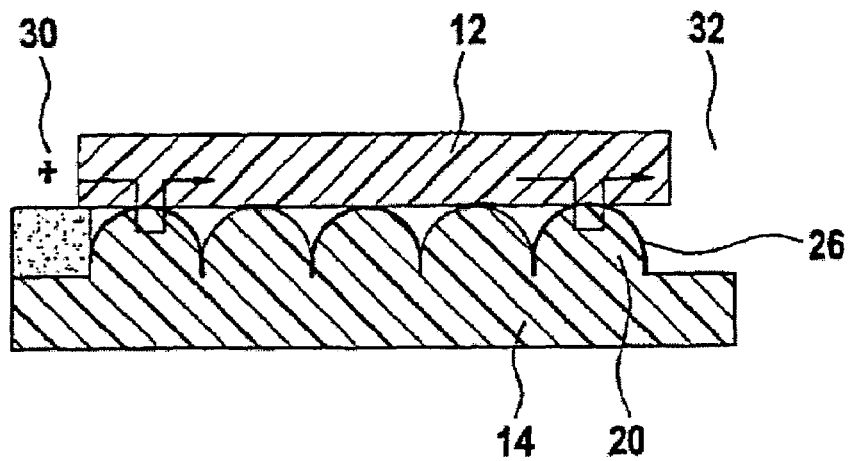
Figure 2B:
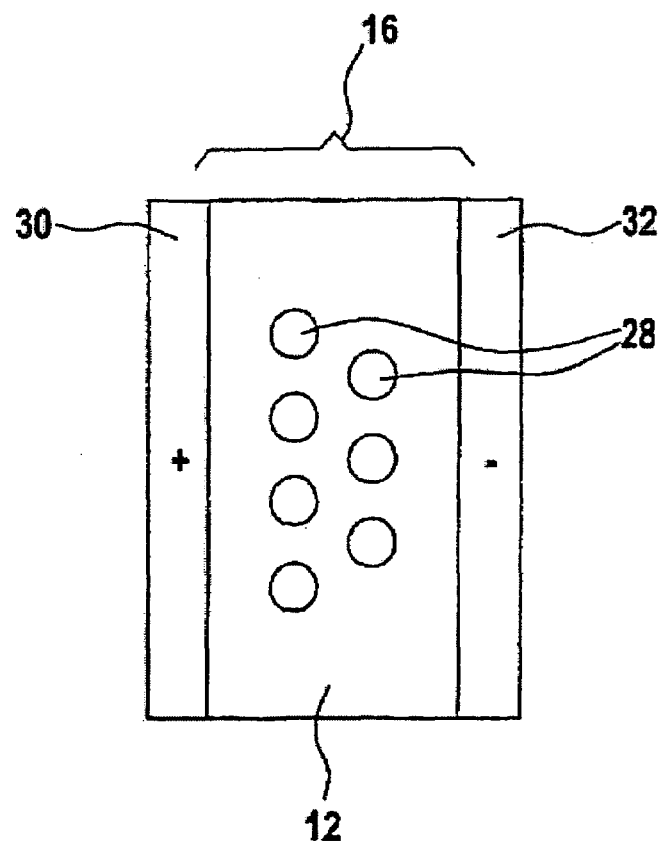

Depending on the electrical wiring, the area of contact can be determined and evaluated by different methods. In this regard, a first embodiment of a pressure sensor is shown in FIGS. 2a and b. In this embodiment, the unstructured sensing layer 12 comprises a resistive material, while at least some of the structures 20 of the second sensing layer 14 are coated with an electrically conductive substance 26. As pressure increases, the size of the conductive islands 28 in contact with the resistive first sensing layer 12 steadily grow (see also FIG. 2b). If the two electrical contacts 30 and 32 are positioned at a distance from each other in the first sensing layer 12, as shown in FIGS. 2a and b, then the measured electrical resistance between the connection electrical contacts 30 and 32 drops with increasing pressure as a consequence of the growth of the islands. A precondition for this electrical configuration is a discontinuous conductive layer of the structured surface (surface conductivity).

FIG. 3 shows another embodiment of a pressure sensor, in which the electrical contacts 30 and 32 are located in the first sensing layer 12. In this embodiment, the second sensing layer 14 comprises a resistive material without a conductive coating. In this embodiment, not only the surface conductivity (of the coating), but also the volumetric conductivity of the sensing layer material is utilized.

FIGS. 4 and 5 show embodiments of a pressure sensor in which only one electrical contact 30 or 32 is present in each sensing layer. In these embodiments too, the electrical resistance falls with increasing pressure. In the embodiment in FIG. 4, not only the surface conductivity, but also the volumetric conductivity of the sensing layer material is utilized. FIG. 5 shows an embodiment of the pressure sensor based on the pressure sensitive parallel switching of two layers of comparable resistivity. As pressure rises, the area of contact increases and with it the electrical interaction between the two layers. In consequence, the electrical resistance falls.

The invention claimed is:
1. Pressure sensor comprising:
    a first carrier foil with a first sensing layer; and
    a second carrier foil with a second sensing layer,
    the first and second carrier foils being arranged in such a way with respect to each other that the first and second sensing layers are facing each other, wherein the first and second sensing layers are configured such that electrical resistance between two terminal contacts of the sensor depends on an area of contact between the two sensing layers, wherein, in the region of an active zone of the pressure sensor, at least the second sensing layer has a microstructured surface with predefined structures formed of an elastic material, wherein the first and second carrier foils are arranged in such a way with respect to each other that, if no force acts on the pressure sensor, the structures of the second sensing layer remain in contact with the first sensing layer and form the area of contact in conjunction said first sensing layer and wherein the structures are compressed under influence of a force exerted on the pressure sensor so that an extent of the area of contact is increased.

2. Pressure sensor according to claim 1, wherein the first sensing layer comprises a first resistive material.

3. Pressure sensor according to claim 2, wherein the structures of the second sensing layer comprise a second resistive material.

4. Pressure sensor according to claim 1, wherein the structures of the second sensing layer comprise an insulating material and wherein at least one of the structures is coated at least in certain parts with a conductive material or a second resistive material.

5. Pressure sensor according to claim 3, wherein at least one of the structures is coated at least in certain parts with a conductive material.

6. Pressure sensor according to claim 3, wherein the second resistive material comprises a lower resistance than the first resistive material.

7. Pressure sensor according to claim 1, wherein the first sensing layer is contacted by the terminal contacts at two contact points located at a distance from each other.

8. Pressure sensor according to claim 7, wherein the two contact points are positioned opposite each other with respect to the active zone of the sensor.

9. Pressure sensor according to claim 1, wherein each of the first and second sensing layers is contacted on the side facing away from the other sensing layer in an extended area by one of the terminal contacts.

10. Pressure sensor according to claim 1, wherein each of the first and second sensing layers is contacted at a contact point by one of the terminal contacts and wherein both contact points are positioned opposite each other with respect to the active zone of the sensor.

11. Pressure sensor according to claim 3 wherein at least one of the first and second resistive material comprises a conductive elastomer material.

12. Pressure sensor according to claim 1, wherein the structures of the microstructured surface are shaped such that they taper in the direction of the first sensing layer.

13. Pressure sensor according to claim 1, wherein the structures of the microstructured surface are produced by a process of injection moulding, etching, stamping, electron beam machining or laser beam machining.

14. Pressure sensor according to claim 1, wherein the first and second carrier foils are laminated together.

15. Pressure sensor comprising:
a first carrier foil with a first sensing layer and
a second carrier foil with a second sensing layer, wherein the first and second sensing layers are configured such that electrical resistance between two terminal contacts of the sensor depends on an area of contact between the two sensing layers, and wherein, in a region of an active zone of the pressure sensor, at least the second sensing layer has a microstructured surface with predefined structures formed of an elastic material, wherein the first and second carrier foils being arranged in such a way with respect to each other that the first and second sensing layers are facing each other and that, if no force acts on the pressure sensor, the structures of the second sensing layer remain in contact with the first sensing layer and form the area of contact in conjunction said first sensing layer; and wherein, under influence of a force exerted on the pressure sensor, the structures are compressed so that an extent of the area of contact is increased.

16. Pressure sensor according to claim 15, wherein the first sensing layer comprises a first resistive material.

17. Pressure sensor according to claim 16, wherein the structures of the second sensing layer comprise a second resistive material.

18. Pressure sensor according to claim 15, wherein the structures of the second sensing layer comprise an insulating material and wherein at least one of the structures is coated at least in certain parts with a conductive material or a second resistive material.

19. Pressure sensor according to claim 17, wherein at least one of the structures is coated at least in certain parts with a conductive material.

20. Pressure sensor according to claim 17, wherein the second resistive material comprises a lower resistance than the first resistive material.

21. Pressure sensor according to claim 15, wherein the first sensing layer is contacted by the terminal contacts at two contact points located at a distance from each other.

22. Pressure sensor according to claim 21, wherein the two contact points are positioned opposite each other with respect to the active zone of the sensor.

23. Pressure sensor according to claim 15, wherein each of the first and second sensing layers is contacted on the side facing away from the other sensing layer in an extended area by one of the terminal contacts.

24. Pressure sensor according to claim 15, wherein each of the first and second sensing layers is contacted at a contact point by one of the terminal contacts and wherein both contact points are positioned opposite each other with respect to the active zone of the sensor.

25. Pressure sensor according to claim 17, wherein at least one of the first and second resistive material comprises a conductive elastomer material.

26. Pressure sensor according to claim 15, wherein the structures of the microstructured surface are shaped such that they taper in the direction of the first sensing layer.

27. Pressure sensor according to claim 15, wherein the structures of the microstructured surface are produced by a process of injection moulding, etching, stamping, electron beam machining or laser beam machining.

28. Pressure sensor according to claim 15, wherein the first and second carrier foils are laminated together.

* * * * *